United States Patent

Russ, Sr.

[11] 3,888,132
[45] June 10, 1975

[54] POSITIVE DRIVE BELT AND SYSTEM

[75] Inventor: Paul E. Russ, Sr., Englewood, Colo.

[73] Assignee: The Gates Rubber Company, Denver, Colo.

[22] Filed: May 15, 1974

[21] Appl. No.: 470,250

[52] U.S. Cl. ............. 74/247; 74/231 C; 74/243 R; 305/35 EB
[51] Int. Cl. ..... F16g 13/02; F16g 1/28; F16h 55/30
[58] Field of Search ......... 305/35 R, 35 EB, 36, 37, 305/38, 13, 57, 41, 53; 74/231 C, 247

[56] References Cited
UNITED STATES PATENTS

| | | | |
|---|---|---|---|
| 3,575,474 | 4/1971 | Russ, Sr. | 305/35 EB |
| 3,756,668 | 9/1973 | Russ, Sr. | 305/35 EB |
| 3,815,960 | 6/1974 | Russ, Sr. | 305/35 EB X |

*Primary Examiner*—Leonard H. Gerin
*Attorney, Agent, or Firm*—H. W. Oberg, Jr.; Raymond Fink; Curtis H. Castleman, Jr.

[57] ABSTRACT

A positive drive belt having a plurality of spaced primary and secondary elastomeric teeth secured thereto. Each primary tooth has a base thickness and height that is substantially greater than the height and longitudinal base thickness of the secondary teeth. At least two secondary teeth are interpositioned between successive primary teeth. A drive pulley having circumferentially spaced teeth meshes with the primary and secondary teeth of the endless belt to effect a positive drive system.

10 Claims, 7 Drawing Figures

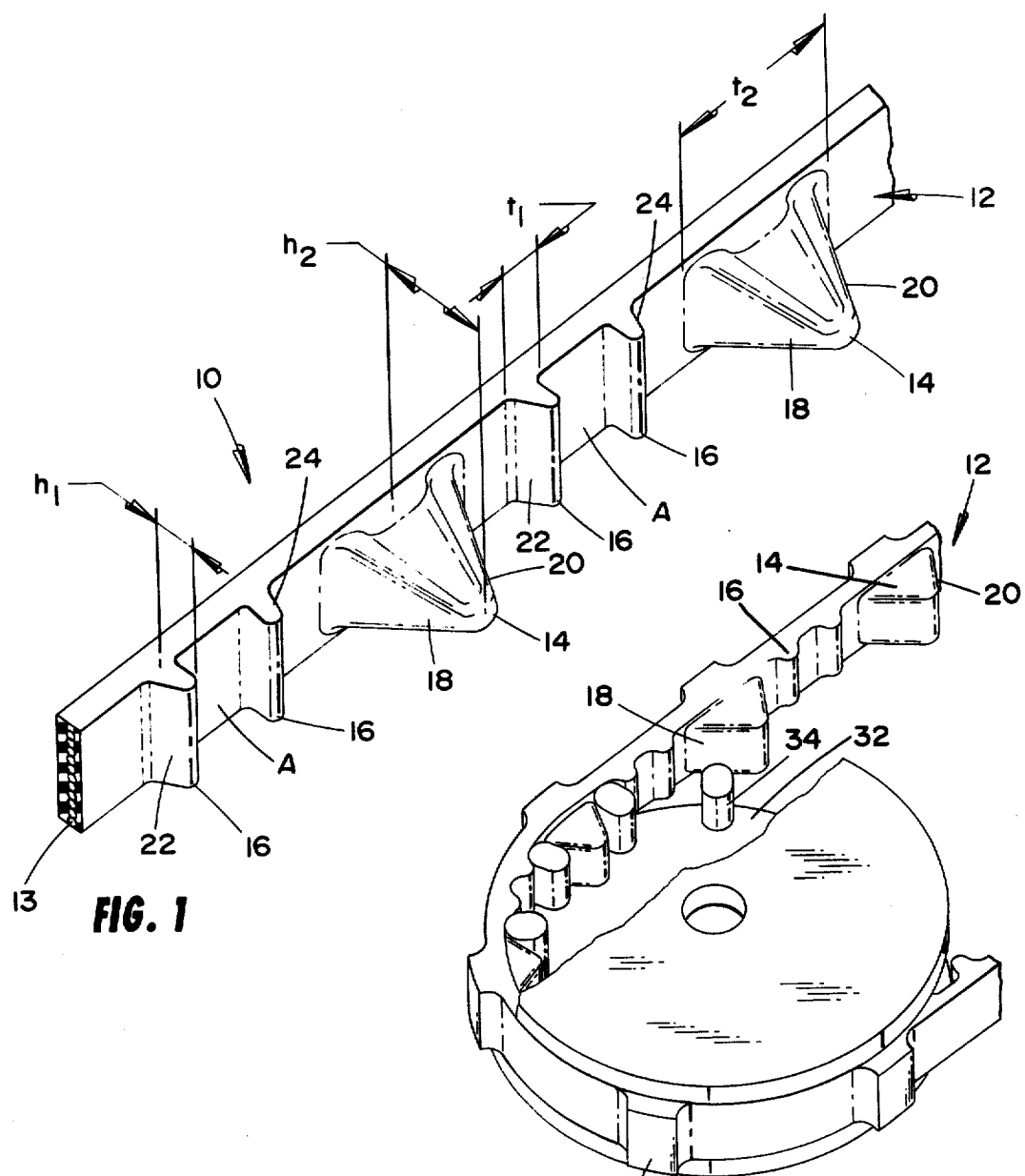
FIG. 1
FIG. 2
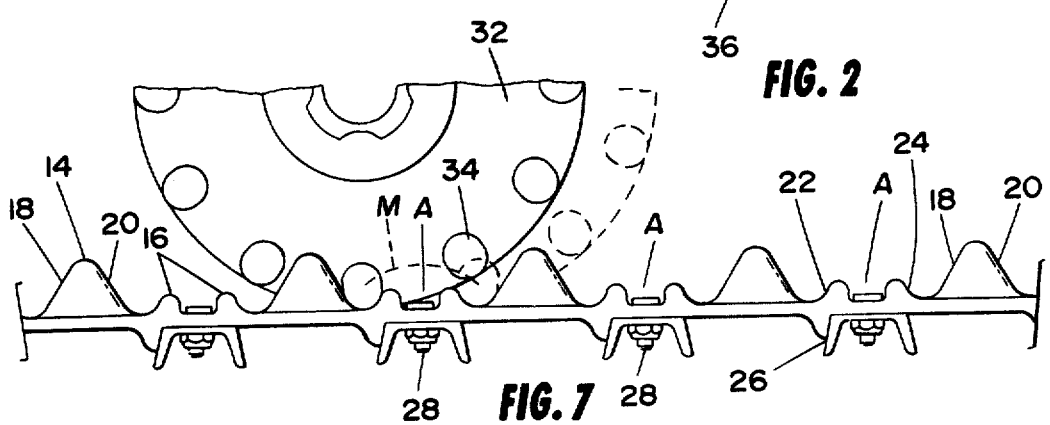
FIG. 7

PATENTED JUN 10 1975

3,889,132

3,888,132

POSITIVE DRIVE BELT AND SYSTEM

BACKGROUND OF THE INVENTION

The invention relates to power drives for machine elements, but more particularly, the invention relates to endless belts with positive drive teeth suitable for use primarily in a fouling environment such as encountered, for example, with snowmobile tracks, conveyor belts and harvesting equipment.

Variable tension ratio type positive drives typically require the use of relatively large teeth. As the tension ratio of such a drive system varies, intermeshing teeth of a pulley move up and down along driving surfaces of the belt teeth to effect a positive drive. A belt tooth with a large height will stay in engagement with a pulley wheel and tolerate larger variations in tension ratios than will a belt tooth of smaller height. To inhibit fouling of the positive drive by foreign debris, prior art designs have avoided teeth with conjugate pulley tooth arrangements. Examples of such positive drive belts are shown in U.S. Pat. No. 3,711,165 and cited references. While such prior art positive drive belts are effective for inhibiting fouling, they introduce some undesirable features. Large spacing between the belt teeth and pulley teeth which enhance anti-fouling tendencies, permit the belt to slip relative to the pulley when operated between foward and reverse. Also, a positive drive output system under small loads has a tendency to be driven by the belt and ride the backside of the belt teeth. Should an element be attached to the belt by means of a fastener, the possibility of interference between the pulley and fastener exists. Such interference may result in early failure of the positive drive system.

SUMMARY OF THE INVENTION

A positive drive belt is provided that has a plurality of spaced primary elastomeric teeth and a plurality of smaller secondary teeth in superimposed longitudinal alignment therewith. At least two secondary teeth are interpositioned between the successive primary teeth. The primary teeth have forward and reverse driving surfaces whereas the secondary teeth have either a forward or reverse driving surface. A pulley with circumferentially spaced pulley teeth meshes with the primary and secondary belt teeth to effect an anti-fouling positive drive system with minimum backlash. The primary teeth effect pulley engagements during large variations in belt tension ratio and the secondary teeth effect minimum pulley backlash while appreciably enhancing anti-drive fouling characteristics.

An object of the invention is to provide the anti-fouling positive drive tolerable of high tension ratios and having anti-backlash capabilities.

Another object of the invention is to provide a positive drive belt to which elements may be attached with mechanical fasteners so that there is very little, if any, probability of interference between the fasteners and drive pulley.

Another object of the invention is to provide a positive drive belt suitable for use as a track for snowmobile type wheel substitute land vehicle.

Another object of the invention is to provide a positive drive belt suitable as conveying systems for harvesting apparatus.

Another object of the invention is to provide an anti-fouling positive drive system which has a minimum amount of backlash between the pulley teeth and belt teeth.

These and other objects or advantages of the invention will become apparent upon reviewing the drawings and description thereof wherein:

FIG. 1 is an isometric view of a portion of an endless belt showing belt teeth of the invention.

FIG. 2 is a view similar to FIG. 1 showing another embodiment of the invention with belt teeth meshing with a toothed pulley.

FIG. 7 is a longitudinal cross-sectional view taken showing the motion of the drive pulley in relation to the positive drive of the belt.

DESCRIPTION OF THE INVENTION

Figure 3:
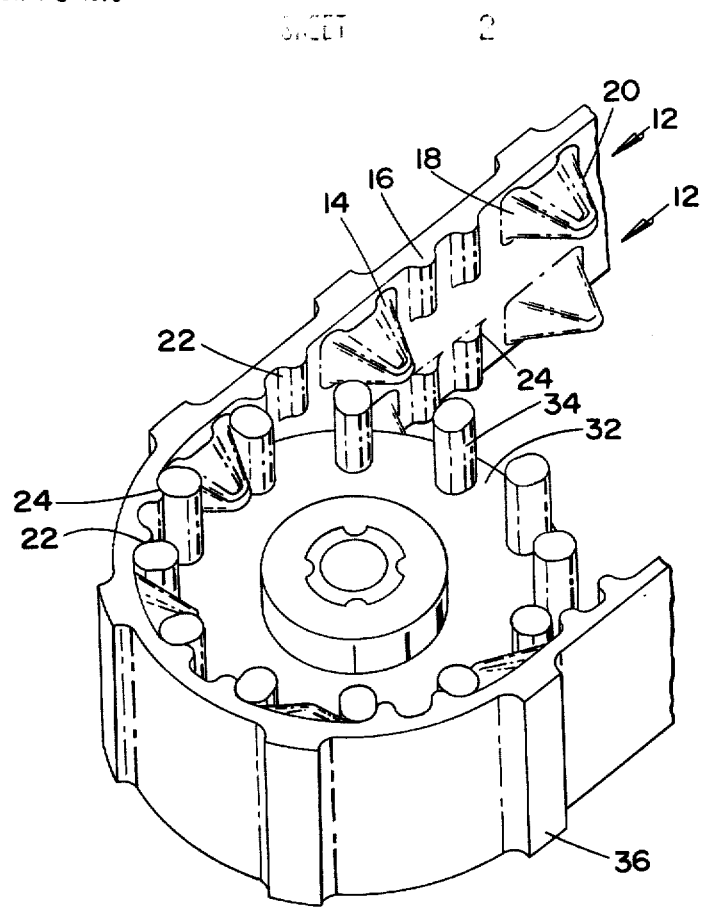
FIG. 3 is a view similar to FIG. 2 showing another embodiment of the positive drive belt engaged with a toothed pulley which effects a positive drive system.

Referring more particularly to FIG. 1 and in accordance with the invention, a positive drive belt 10 is provided which has at least one row 12 of longitudinally aligned elastomeric teeth. The belt is molded and fabricated using any number of known techniques such as the rubber fabrication process or the liquid elastomeric cast process and may include embedded reinforcements such as a tensile member 13. Similarily, the belt may be made of any desired polymeric materials such as natural rubbers, synthetic rubbers or blends thereof, rubber or plastic like materials such as polyurethane or Hytrel as sold by duPont. The belt may have at least one row of spaced teeth or optionally, two or more spaced rows of teeth as illustrated in FIGS. 3–6. Each row 12 includes primary 14 and secondary 16 elastomeric teeth. At least two spaced secondary teeth 14 are interpositioned between successive primary teeth 16. Thus, there are at least twice as many secondary teeth 14 in a row 12 as there are primary teeth 16 in a row 12.

Each primary tooth 14 has two generally transversely oriented oppositely facing surfaces 18, 20 that accommodate positive driving in both a forward and reverse direction. The primary teeth have sufficient height $h2$ which substantially precludes disengagement from a toothed pulley when large tension ratios are encountered by the belt.

The interpositioned secondary teeth 16 are much smaller than the primary teeth in terms of both height $h1$ and longitudinal base thickness $t2$. Each secondary tooth has one driving surface. The driving surfaces 22, 24 of the secondary teeth that are interpositioned between successive primary teeth, face away from each other. The driving surfaces 22, 24 of the secondary teeth are substantially in transverse alignment with the belt and have a general driving surface contour as those same facing surfaces 18, 20 of the primary teeth. The longitudinal or pitch spacing between the driving surfaces 22, 24 of each two interpositioned primary teeth is substantially equivalent to the longitudinal base thickness of the primary teeth. Preferably, the pitch between the same facing driving surfaces of the primary and secondary teeth is substantially constant. For example, the pitch spacing between surfaces 18 and 20 is constant as is the pitch spacing between surfaces 20 and 24. Also, the spacing of surfaces 18–22 substantially equals the spacing of surfaces 20–24. A constant pitch spacing permits the use of a toothed pulley. Of course, the spacing could be changed between the primary and secondary teeth; however, this requires a special pulley that is aligned with the belt teeth for proper engagement.

Figure 4:
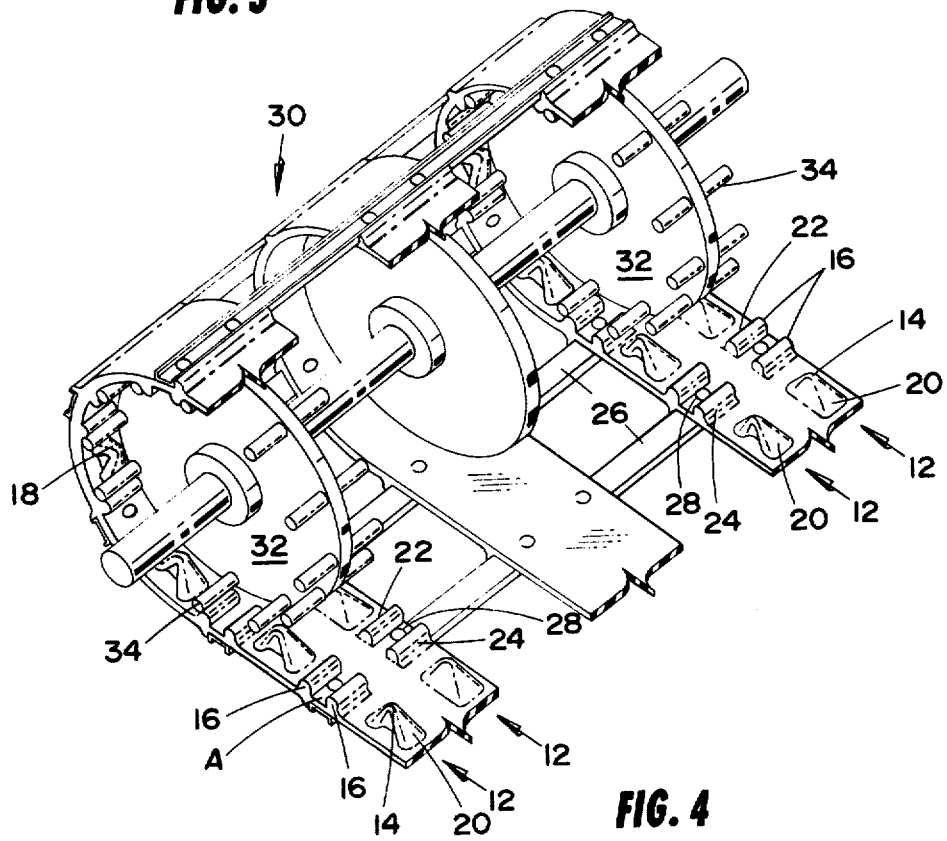
FIGS. 4 and 5 are isometric views of positive drive belts of the invention with attachments thereto to effect endless tracks for snowmobiles.

The spacing between the two interpositioned secondary teeth define a protected area A on the belt for locating a fastener for attaching elements to a belt or means for attaching belts together. For example and as shown in FIG. 4, two or more belts of substantially the same circumferential length are arranged side-by-side in parallel alignment. A plurality of spaced grouser-bars 26 are transversely aligned in relation to the belts at the belt exterior. Fasteners 28 such as large head rivets or bolts are used to attach the grouser-bars to the belts. The point of attachment is the protected area A between the interpositioned secondary teeth 16. The endless belts and grouser-bars define an endless track 30 suitable for snowmobile use.

When such a belt is operated toothed pulleys are used to positively drive or propel the track. The toothed pulleys 32 of the example include a wheel from which axially aligned pulley teeth 34 project. The wheel may be interpositioned between the spaced rows of lugs and the pulley teeth mesh with the primary and secondary belt teeth as shown in FIGS. 3–6. A snowmobile track 30 is chosen for the purpose of explaining the invention as it requires a positive drive with greatly varying tension ratio capability.

When tension on a belt is reduced such as happens when a snowmobile suspension system is deflected or when a surge of power is applied to the track, the teeth of the pulley wheel climb the driving surfaces of the primary belt teeth. The large driving surfaces insure constant engagement with the toothed pulley. Should the tension of the belts become too slack, it is possible in some situations for the pulley to ratchet with respect to the belt teeth. When this occurs, the pulley teeth ride up the driving surfaces of the primary teeth and past the driving surface of the secondary teeth. The high profile of the primary teeth insures that a pulley tooth will never touch the protected area between the two interpositioned secondary teeth. This is shown schematically in dotted form in FIG. 7. The dotted line M shows the relative motion of the tooth 34 as it passes over protected area A away from the head of the fastener 28. Thus, should ratcheting between the pulley and belt teeth occur, the pulley teeth will not be able to engage the fastener 28 within its protected area A. Since the fastener cannot be touched, both it and the pulley teeth are protected from wear which could cause early failure of either. Both the primary 14 and secondary teeth 16 are engaged by the pulley teeth and are used to positively drive the belt in one direction when nominal tension ratios are maintained. Should the belt be driven in a reverse direction, the pulley teeth engage the facing away driving surfaces of the primary lugs and the driving surfaces of the same facing secondary lugs. Positively driving the belt in a reverse manner occurs such as during breaking, deacceleration, or when positively driving an output toothed pulley.

An advantage of the positive drive belt is that it is anti-fouling. The smaller secondary teeth 16 permit the primary lugs 14 to be spaced far apart allowing room for foreign debris or particles. The particles may accumulate in the spaced area between the two interpositioned secondary lugs and the pulley. For maximum anti-fouling capability, the pulley should be substantially as shown with small pulley teeth and large open areas around the belt teeth when the pulley and belt are engaged in positive drive.

When the drive system is to be operated in a "caking" environment where foreign debris is apt to accumulate, it is then preferred to have the primary and secondary lugs engage alternate portions of the pulley. This is done by having the cumulative teeth of a row (the sum of the primary and secondary belt teeth) and the pulley teeth equal an odd number. When this is done, the primary and secondary belt teeth will alternate positions relative to the pulley teeth for each revolution of the belt or pulley. Under such an arrangement, "caked" foreign debris at the pulley is repeatedly pushed out by the larger primary belt teeth.

Additional Species

Figure 5:
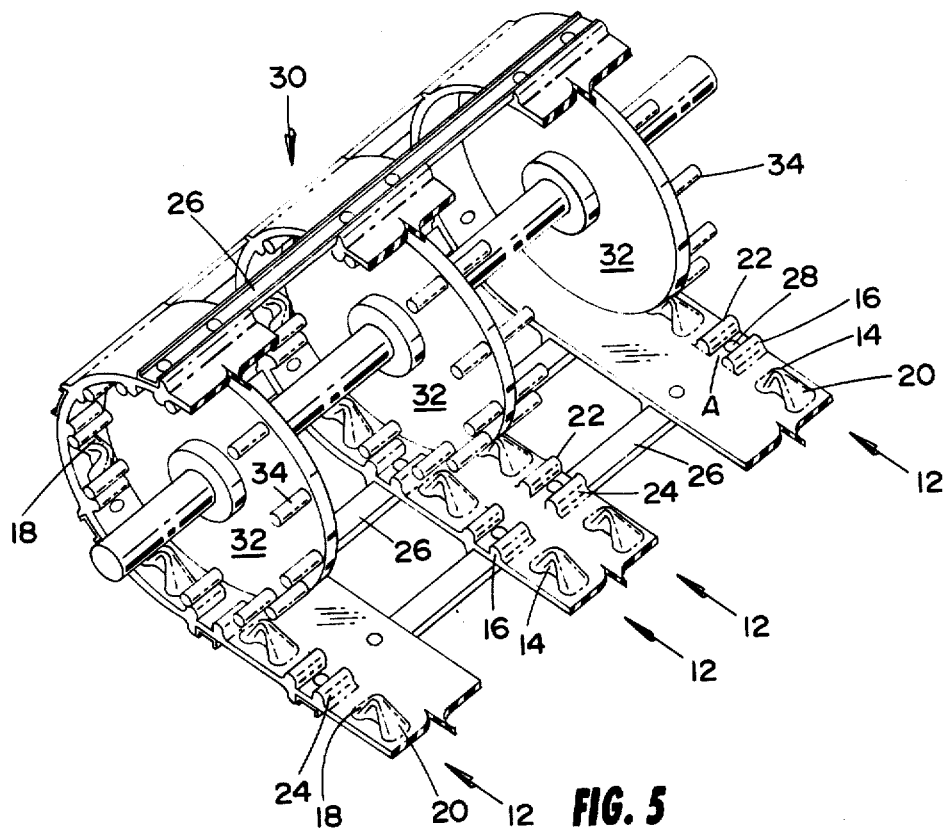

Various types of pulley arrangements may be used to mesh with the belt teeth. When a single row of teeth are used as in FIGS. 1 and 2, a squirrel cage type pulley such as shown in FIG. 2 may be used. Optionally, one-sided toothed pulleys as shown in FIG. 5 may be used to mesh with one row of lugs. The belt teeth may be shaped as desired. For example, the primary teeth may be "dished" on their sides to save material as shown in FIG. 1, or the teeth may be full as shown in FIG. 3.

Figure 6:
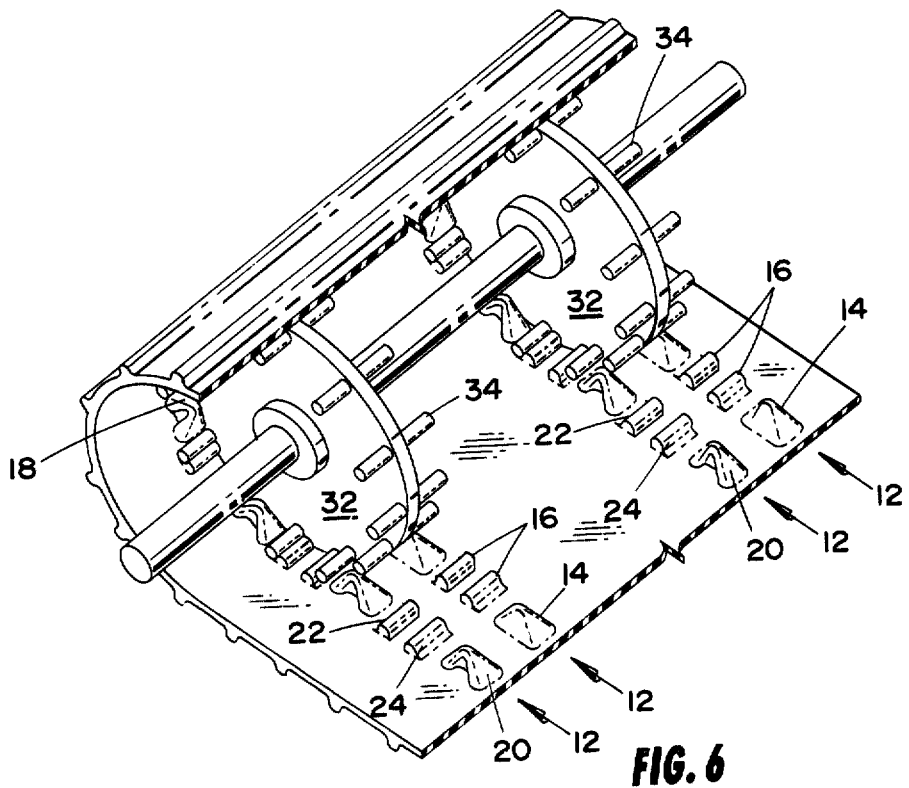
FIG. 6 is an isometric view showing a positive drive system of the invention for an integrally molded endless track.

Referring now to FIG. 6, a wide belt such as used for snowmobile tracks or conveyor systems is shown. Two rows of longitudinally oriented teeth are placed near the outside circumferential edge of the belt. The rows of teeth include the primary 14 and secondary 16 pulley teeth as shown. The teeth 14, 16 are all substantially in lateral alignment. Preferably, the primary teeth are all aligned with each other. However, the successive rows may have alternately transversely aligned secondary and primary teeth for the purpose of minimizing the probability of ratcheting. The drive system works in a manner similar to that as previously explained.

FIGS. 2 and 3 are exemplary of belts which may be used in agricultural crop gathering systems. Crop engaging lugs 36 are integrally molded on the outside surface of the belt opposite the primary lugs 14 for maximum flexibility. Likewise, lugs are excluded at the outside surface of the belt opposite the secondary lugs for maximum flexibility.

The foregoing detailed description is made for purpose of illustration only and is not intended to limit the scope of the invention which is to be determined from the appended claims.

What is claimed is:

1. A positive drive belt comprising:
    spaced elastomeric primary teeth secured to the belt, each primary tooth having a longitudinal base thickness; and
    at least two spaced elastomeric secondary teeth secured to the belt interpositioned between and spaced from successive primary teeth, each secondary tooth having a height less the primary teeth and a longitudinal base thickness less than half of each primary tooth.

2. A positive drive belt as set forth in claim 1 comprising:

at least two spaced rows of substantially equally spaced teeth longitudinally arranged on the inner surface of the belt, the teeth of one row substantially in transverse alignment with the teeth of the spaced row, the spaced rows of teeth constituting the primary teeth.

3. A positive drive belt as set forth in claim 1 wherein each primary tooth has two transversely oriented driving surfaces facing away from each other, and the two secondary teeth interpositioned between successive primary teeth have one transversely oriented driving surface facing away from each other, the pitch spacing substantially equal for all same facing driving surfaces.

4. A positive drive belt as set forth in claim 3 wherein the longitudinal base thickness of the primary teeth is generally equal to the spacing between the facing away driving surfaces of the secondary teeth interpositioned between successive primary teeth.

5. A positive drive belt as set forth in claim 1 wherein the primary and secondary teeth have transverse widths that are generally equal.

6. A positive drive belt as set forth in claim 1 wherein the area defined between two successively spaced secondary teeth establishes a location for securing fasteners to the belt.

7. A positive drive system comprising:
at least one generally flat endless belt;
at least two spaced rows of substantially equally spaced primary teeth longitudinally arranged on each belt inner surface, the teeth of one row substantially in transverse alignment with the teeth of the spaced row, the teeth having height and longitudinal base thickness;
at least two spaced rows of spaced secondary teeth interpositioned and aligned superimposed with the rows of primary teeth, the secondary teeth of a row substantially transversely aligned with the secondary teeth of the spaced row, and at least two secondary teeth interpositioned between successive primary teeth; and
at least one drive pulley with a plurality of axially aligned circumferentially spaced pulley teeth that mesh with the primary and secondary teeth of the belt.

8. A positive drive system as set forth in claim 7 comprising:
at least two flat belts of substantially the same circumferential length spaced side-by-side substantially parallel with each other, the belts having substantially the same teeth spacings, and the belt teeth arranged in substantially transverse alignment with each other; and
a plurality of spaced grouser-bars arranged substantially transversely in relation to the belts, the grouser-bars secured to the belts with means located between each two secondary teeth disposed between successive primary teeth.

9. A crop engaging belt comprising:
at least two spaced rows of substantially equally spaced primary teeth longitudinally arranged on each belt inner surface, the teeth of one row substantially in transverse alignment with the teeth of the spaced row, the teeth having height and longitudinal base thickness;
at least two spaced rows of spaced secondary teeth interpositioned and aligned superimposed with the rows of primary teeth, the secondary teeth of a row substantially transversely aligned with the secondary teeth of the spaced row, and at least two secondary teeth interpositioned between successive primary teeth; and
at least one drive pulley with a plurality of axially aligned circumferentially spaced pulley teeth that mesh with the primary and secondary teeth of the belt.

10. A crop engaging belt comprising:
at least two spaced rows of spaced secondary teeth interpositioned and aligned superimposed with the rows of primary teeth, the secondary teeth of a row substantially transversely aligned with the secondary teeth of the spaced row, and at least two secondary teeth interpositioned between successive primary teeth;
at least one drive pulley with a plurality of axially aligned circumferentially spaced pulley teeth that mesh with the primary and secondary teeth of the belt; and
a crop engaging member disposed on the outer surface of the belt.

* * * * *